(12) United States Patent
Walter

(10) Patent No.: US 9,126,755 B2
(45) Date of Patent: Sep. 8, 2015

(54) APPARATUS FOR INVERTING AN OBJECT

(75) Inventor: Christopher Stephen Walter, New South Wales (AU)

(73) Assignee: WRIGHTWAY ECO PTY LTD, New South Wales (AU)

(*) Notice: Subject to any disclaimer, the term of this patent is extended or adjusted under 35 U.S.C. 154(b) by 544 days.

(21) Appl. No.: 13/520,800

(22) PCT Filed: Dec. 21, 2010

(86) PCT No.: PCT/AU2010/001722
§ 371 (c)(1),
(2), (4) Date: Jul. 6, 2012

(87) PCT Pub. No.: WO2011/082445
PCT Pub. Date: Jul. 14, 2011

(65) Prior Publication Data
US 2013/0017046 A1    Jan. 17, 2013

(30) Foreign Application Priority Data
Jan. 6, 2010    (AU) ................ 2010200047

(51) Int. Cl.
*B65F 3/08*     (2006.01)
*B65F 1/14*     (2006.01)
*B65G 65/23*    (2006.01)
*B66F 7/22*     (2006.01)

(52) U.S. Cl.
CPC ............ *B65F 3/08* (2013.01); *B65F 1/1452* (2013.01); *B65G 65/23* (2013.01); *B66F 7/22* (2013.01)

(58) Field of Classification Search
CPC .......... B65F 1/1452; B65F 3/08; B65G 65/23
USPC ......... 414/409, 420, 422, 424, 425, 599, 648, 414/653, 656
See application file for complete search history.

(56) References Cited

U.S. PATENT DOCUMENTS 2,592,324 A * 4/1952 Oliver ........................... 414/409
2,647,651 A * 8/1953 Vincent ......................... 414/648

(Continued)

FOREIGN PATENT DOCUMENTS

AT       399489     5/1995
BE       1007638    8/1995

(Continued)

OTHER PUBLICATIONS

International Search Report for PCT/AU2010/001722, Completed by the Australian Patent Office on Jan. 17, 2011, 3 Pages.

*Primary Examiner* — James Keenan
(74) *Attorney, Agent, or Firm* — Brooks Kushman P.C.

(57) ABSTRACT

An apparatus for at least partly inverting an object. The apparatus having a support for supporting the object, a first guide, a pivotally mounted second guide, and a first and second tracking device each positioned in fixed location relative to the support. In operation, a drive unit moves the first tracking device in a first direction along or within the first guide and continued operation of the drive unit in the first direction causes the second tracking device to enter the second guide, and further continued operation of the drive unit in the first direction causes the first tracking device to continue moving in the first guide in the first direction and causes the second tracking device to move along the second guide and to cause pivotal movement of the second guide to thereby tilt the support.

16 Claims, 13 Drawing Sheets

(56) References Cited

U.S. PATENT DOCUMENTS

| | | | |
|---|---|---|---|
| 3,417,888 A | | 12/1968 | Naab |
| 3,452,891 A | * | 7/1969 | Wilson et al. ............... 414/409 |
| 3,520,428 A | * | 7/1970 | Puckett .................... 414/409 |
| 4,348,147 A | * | 9/1982 | Helm ....................... 414/420 |
| 4,597,710 A | | 7/1986 | Kovats |
| 4,872,801 A | * | 10/1989 | Yeazel et al. ............... 414/409 |
| 6,238,165 B1 | * | 5/2001 | Fletcher et al. ............. 414/422 |
| 6,644,907 B1 | * | 11/2003 | Pinder ..................... 414/424 |
| 2011/0091309 A1 | * | 4/2011 | May ........................ 414/758 |

FOREIGN PATENT DOCUMENTS

| | | | | |
|---|---|---|---|---|
| FR | 2911858 A1 | * | 8/2008 | ........... B65G 65/23 |
| GB | 2191461 | | 12/1987 | |
| GB | 2211166 A | * | 6/1989 | ............... B66F 3/08 |
| JP | 54129660 | | 10/1979 | |

* cited by examiner

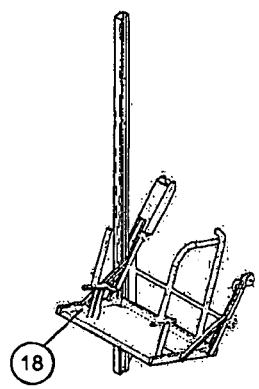
Figure 9A
Figure 9
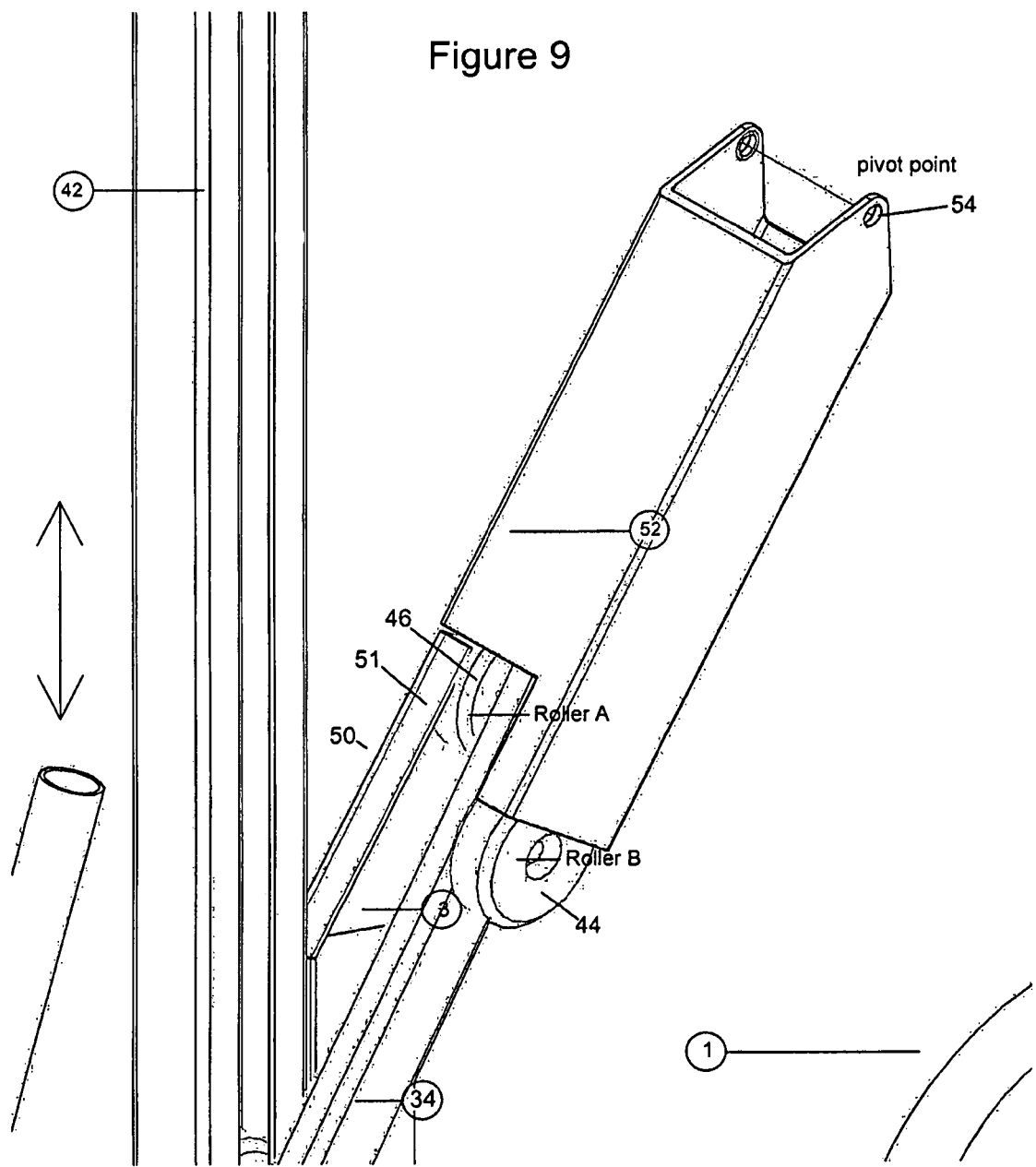

APPARATUS FOR INVERTING AN OBJECT

CROSS-REFERENCE TO RELATED APPLICATION

This application is the U.S. national phase of PCT Appln. No. PCT/AU2010/001722 filed on Dec. 21, 2010, which claims priority to AU Patent Application No. 2010200047 filed on Jan. 6, 2010, the disclosures of which are incorporated in their entirety by reference herein.

FIELD OF THE INVENTION

The present invention relates to an apparatus for at least partly inverting an object. In one embodiment, the present invention relates to an apparatus for at least partly inverting a bin, such as a rubbish bin, to thereby empty the contents of the bin.

BACKGROUND TO THE INVENTION

There have been a number of machines developed over the years for emptying rubbish bins. For example, domestic rubbish bins (often referred to as "wheelie bins") are emptied into a rubbish truck using an apparatus that includes grippers that grip the bin and an articulated arm that is operated by hydraulics to lift the bin up and invert the rubbish bin. In modern day rubbish trucks, these arms are operated by the driver of the vehicle. The driver does not need to exit the rubbish truck in order to operate these arms. Accordingly, the driver is safely located well away from all moving parts of the bin lifting apparatus.

There have also been some other bin lifting apparatus developed for emptying rubbish bins into larger rubbish receptacles, such as dumpsters or skips. These apparatus are typically located adjacent to the larger rubbish receptacle. The rubbish bin is wheeled into or positioned on a support platform or is held in place by grabs under the lip of the bin. The bin lifting apparatus is then operated to lift the bin and to tilt or invert the bin so that the contents of the bin are emptied into the larger rubbish receptacle. These types of bin lifting apparatus are often found in factories and other workplaces. In order to improve the safety aspects of these bin lifting apparatus, it is typical to provide the bin lifting apparatus with a door or cage that must be closed after the rubbish bin has been positioned in the bin lifting apparatus. The apparatus will only operate once the door or cage has been closed. In this manner, the human operators of the bin lifting apparatus can position the rubbish bin in the lifting apparatus, step back from the lifting apparatus, close the door or cage and subsequently operate the bin lifting apparatus to lift the top of the bin above the level of the larger waste receptacle and then invert the bin so that the contents of the bin are emptied into larger waste receptacle.

In one such bin lifting apparatus known to the present applicant, the bin lifting apparatus includes a support that supports the rubbish bin to be emptied. A lifting apparatus, in the form of a chain drive, operates to lift the support (and also to lift the bin that is held in place on the support). A roller or other tracking device is mounted to the support. As the support is lifted by the lifting apparatus, the roller or other tracking device moves along a track. The track includes a generally vertical section and a goose neck or inverted U-shaped section. When the roller or other tracking apparatus enters the goose neck or inverted U-shaped section, the support (and the bin positioned on the support) starts to tilt and becomes inverted. This allows the contents of the rubbish bin to be emptied.

Although this bin lifting apparatus operates satisfactorily, the goose neck creates a pinch point, thereby causing potential occupational health and safety issues.

Throughout this specification the term "comprising" and its grammatical equivalents shall be taken to have an inclusive meaning unless the context of use indicates otherwise.

The present applicant does not concede that the prior art discussed in this specification forms part of the common general knowledge in Australia or elsewhere.

BRIEF DESCRIPTION OF THE INVENTION

In one aspect, the present invention provides an apparatus for at least partly inverting an object comprising
a support for supporting the object,
a first guide,
a second guide, the second guide being pivotally mounted,
a first tracking device being positioned in fixed location relative to the support, the first tracking device being movable along or within the first guide,
a second tracking device being positioned in fixed location relative to the support, the second tracking device being adapted to move along or within the second guide, and
moving means for moving the support,
wherein the moving means is operable to cause the first tracking device to move in a first direction along or within the first guide and continued operation of the moving means in the first direction causes the second tracking device to enter the second guide, and further continued operation of the moving means in the first direction causes the first tracking device to continue moving in the first guide in the first direction and causes the second tracking device to move along the second guide and to cause pivotal movement of the second guide to thereby tilt the support.

In some embodiment, the present invention relates to apparatus for at least partly inverting a bin, such as a rubbish bin, or a container.

Throughout this specification, the term "at least partly invert" or its grammatical equivalents shall be taken to mean an object is inverted to a sufficient degree to empty contents from the object.

The support supports the object that is to be inverted. The support may comprise a support platform, a support frame, a support plate, a support base or indeed any other supporting means. The support may comprise a cradle having a floor or a base portion. The support may include a support frame.

In some embodiments, the apparatus further comprises holding means for holding the object in position. The holding means may hold the object in position and prevent the object from falling off the support during inversion of the object. The holding means may comprise a gripping means that grips the object that has been placed on the support. Alternatively, the holding means may comprise restraining means for restraining the object on the support.

In one embodiment, the apparatus relates to an apparatus for at least partly inverting rubbish bins, which rubbish bins include one or more wheels to facilitate transport of the rubbish bins. In this embodiment, the holding means may comprise a restraining bar or a restraining plate located above a position of one or both wheels on the rubbish bin when the rubbish bin is positioned on the support. As the bin is inverted, the one or more wheels come into contact with the restraining bar or restraining plate and the bin is thereby restrained or held.

The first guide acts to guide the first tracking device along a desired path of travel. The first guide may comprise a track, a sleeve, a rack or a channel. The first guide may comprise a generally straight guide, such as a generally straight track or channel. In some embodiments, the first guide comprises a generally vertical guide, such as a generally vertical track or channel.

The second guide acts to guide the second tracking device along a path of travel. The second guide may comprise a track or a rack or a sleeve or a channel. The second guide is pivotally mounted and therefore the second guide can pivotally move about a pivot point. The second guide may be pivotally mounted at one point. The second guide may be pivotally mounted at or near one end thereof. The second guide may be arranged such that it extends at an angle to both the horizontal and vertical when in a resting position. The second guide may extend downwardly at an angle when in a resting position.

In some embodiments, the apparatus may be provided with a fixed guide for guiding the second tracking device into the second guide. The fixed guide may comprise a fixed track, a fixed channel, a fixed wall or a fixed sleeve.

The first tracking device tracks along or within the first guide. In some embodiments, the first tracking device may comprise a roller or indeed any other device that moves along or within the first guide. In alternative embodiments, the first tracking device may comprise a body or a block of material that moves along or within the first guide. The body or the block of material may be of low friction material.

The second tracking device tracks along or within the second guide. In some embodiments, the second tracking device may comprise a roller or rollers or indeed any other device that moves along or within the second guide. In alternative embodiments, the second tracking device may comprise a body or a block of material that moves along or within the second guide. The body or the block of material may be of low friction material. In some embodiments, the second tracking device may comprise two or more rollers or two or more blocks of material.

The first tracking device and the second tracking device are mounted in fixed position relative to the support. The first tracking device may be mounted to an arm and the second tracking device may also be mounted to the arm. The first tracking device may be spaced from the second tracking device. In one embodiment, the first tracking device may comprise a roller mounted to the arm and the second tracking device may comprise a plurality of rollers mounted to the arm at a position or positions located away from the first roller.

In some embodiments, the apparatus may be provided with one first guide and one second guide. In other embodiments, the apparatus may be provided with two or more first guides and two or more second guides. For example, the apparatus may be provided with one set of a first guide and a second guide located on one side of the support and a second set of a first guide and a second guide located on the other side of the support. Appropriate first and second tracking devices for each of the first and second guides will also be provided.

The moving means may comprise any suitable apparatus for moving the support. The moving means may comprise a drive means. The moving means may comprise a chain drive, a belt drive, a worm gear drive, a rack and pinion drive, a winch and cable drive, or a gear drive. The moving means may also comprise an extendable and retractable ram. The extendable and retractable ram may be a pneumatic ram, a hydraulic ram or an electrohydraulic ram. The moving means may comprise a stepper motor. The moving means may be actuated by an electric motor, a hydraulic motor, pneumatic means (such as compressed air), or an internal combustion motor. The moving means may be actuated by an electrohydraulic drive. In some embodiments, the moving means could even be manually operated or manually actuated.

The apparatus of the present invention may be mounted to frame. The frame may comprise a movable frame. The frame may include wheels or castors to facilitate easy movement of the frame. The wheels or castors may include locking mechanisms to lock the wheels or castors once the frame has been positioned in a desired position. The frame may be fitted with lugs to allow the frame to be bolted down in a permanent location.

The apparatus may also include a safety door or a safety cage, or both. Access to the support may be provided via the safety door or safety cage. The safety door or safety cage may need to be in a closed position before the moving means can be actuated to lift and invert the object. Alternatively, operation of the apparatus may require operation of operating means located away from the support, thereby locating the operator a safe distance away from the support. Other lockout systems may also be used.

The apparatus may further comprise control means for controlling operation of the moving means. For example, the control means may simply comprise an "on" button that is pressed when it is desired to raise and invert the object. Operation of the "on" button may take the apparatus through one complete cycle where the object is inverted and then the support (and the object) is returned to its starting position. Alternatively, the control means may comprise an "on" button and an "off" button. More sophisticated control means may also allow for the option of selecting the direction of travel of the moving means. For example, the moving means may be operated to cause the support to move upwardly or to cause the support to move downwardly.

The control means may also include a safety interlock to ensure that the moving means can only be actuated when certain safety requirements have been met. Typically, the safety requirements will comprise at least closing of a safety door or a cage door to ensure that human operators cannot be contacted by the moving platform or trapped under the moving platform.

In operation of the apparatus of the present invention, an object is placed on the support. The moving means is then operated to cause the first tracking device to move along the first guide. As the first tracking device and the second tracking device are fixed in position relative to the support, the second tracking device also moves. Typically, the support will initially move from a lowermost position in a generally upwardly direction. This causes the first tracking device to move upwardly in the first guide. As the support moves upwardly, the second tracking device will come into contact with the second guide. The second tracking device then starts to move along the second guide. When in the resting position, the second guide will typically extend downwardly at an angle. Continued operation of the moving means causes the first tracking device to continue to move upwardly in the first guide and the second tracking device to move further along the second guide. As the second guide is pivotally mounted, it starts to move pivotally around its pivot point. As the first tracking device continues to move up the first guide, the second guide rotates upwardly towards a horizontal position and then continues to rotate so that it extends upwardly at an angle to the horizontal. As this movement of the second guide is taking place, the support is also caused to tilt or pivot and the object on the support becomes inverted.

Once movement of the first tracking device has reached its upper maximum limit, the moving means operates to move the first tracking device in the opposite (typically downwards) direction. This may occur by the operator being required to send a "down" signal from the control means to cause the moving means to move the first tracking device in the downwards direction. Alternatively, the moving means automatically changes to downwards movement once the first tracking means reaches its uppermost limit of travel. For example, the apparatus may be provided with limit switches that cause the moving means to move the first tracking means in the downwards direction once the first tracking means reaches its uppermost limit of travel. This causes the second guide to pivot in an opposite manner. As the first tracking device continues to move down the first guide, the second tracking device will eventually be withdrawn from the second guide. The moving means continues to operate until the support is again positioned in its lowermost position. The object on the support may then be removed and replaced with another object, such as another bin that needs to be emptied.

The present invention provides an apparatus for inverting an object, such as a bin, which eliminates pinch points. This enhances the safety aspects of using the device.

BRIEF DESCRIPTION OF THE DRAWINGS

In FIG. 1, the support is positioned in a lowermost position;

In FIG. 2, the support has started to move in an upward direction;

In FIG. 3, the second tracking device has just entered the second guide and the support is starting to pivot;

In FIG. 4, the second tracking device has entered the second guide and the support is pivoting further;

In FIG. 5, the support continues to pivot and tilt;

In FIG. 6, the object is inverted;

FIG. 9 shows an expanded view of the first guide and the second guide, with the second tracking device more fully entering the second guide;

FIGS. 7A to 12A show a perspective view of part of the apparatus (including the support), with the orientation of the support shown in FIGS. 7A to 11A corresponding to the orientation of the support when the first tracking device and second tracking device are in the positions shown respectively in FIGS. 7 to 11.

DETAILED DESCRIPTION OF THE DRAWINGS

Figure 1:
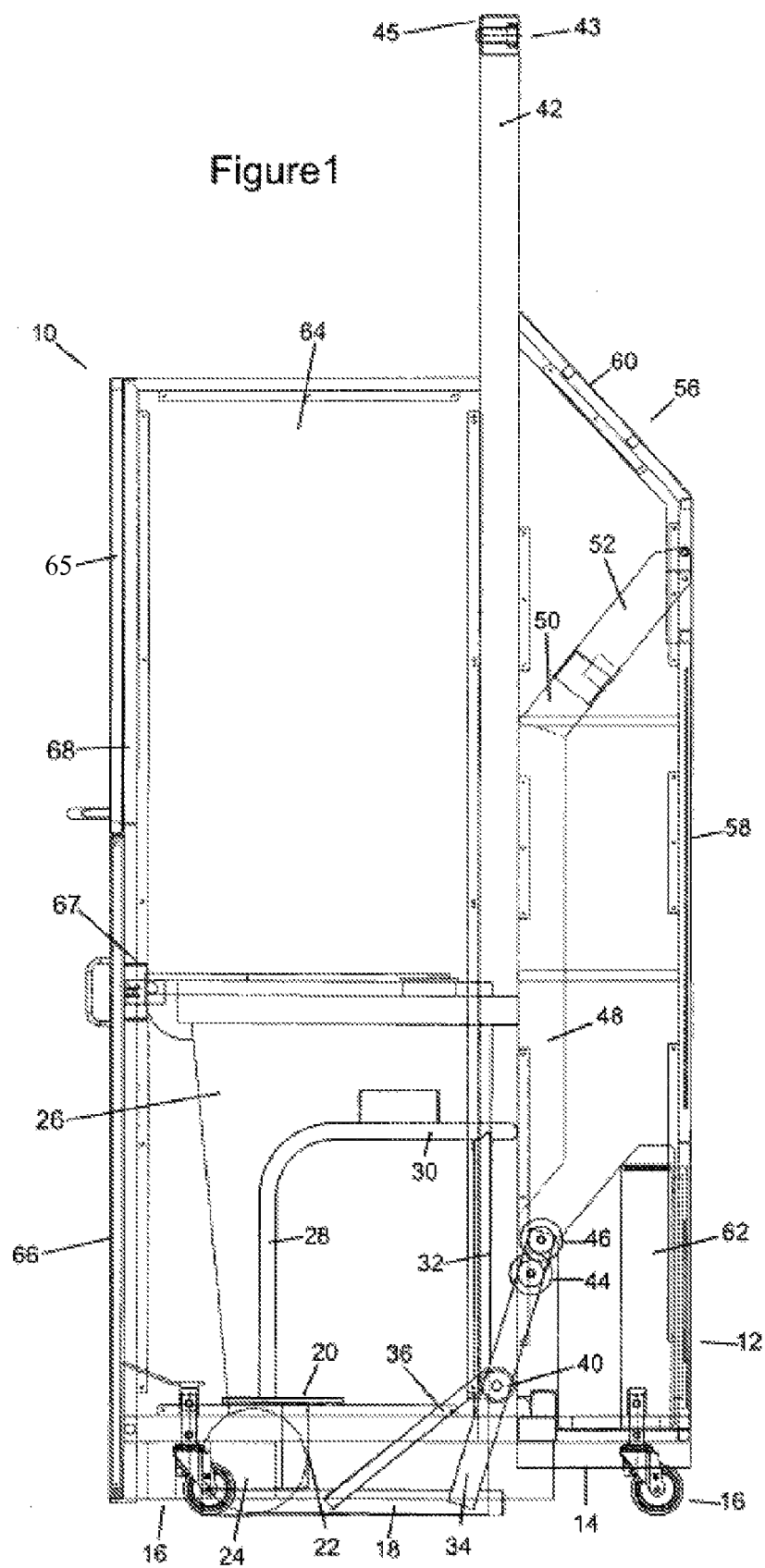
FIG. 1 shows a side view of an apparatus in accordance with the present invention.
Figure 2:
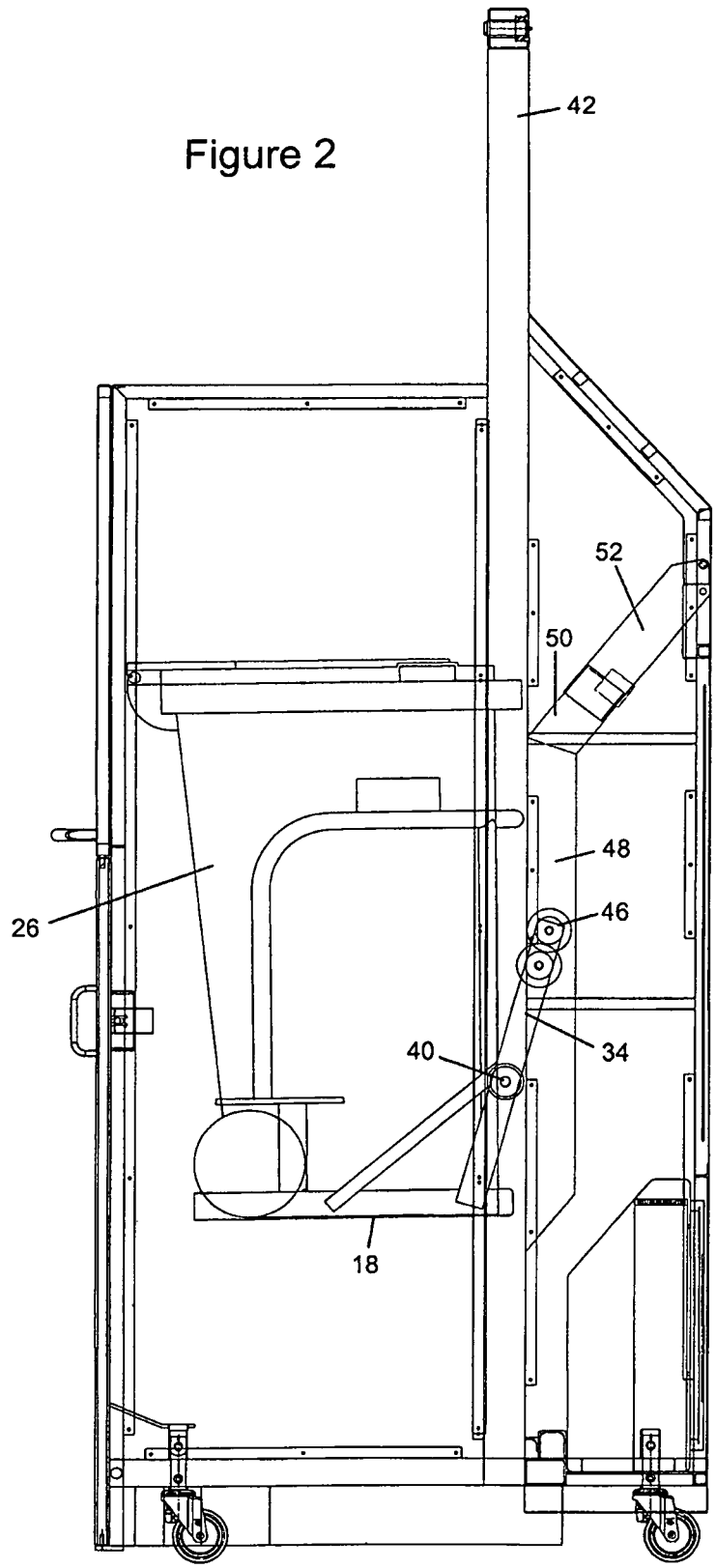
FIG. 2 shows a side view of the apparatus shown in FIG. 1.

It will be understood that the drawings have been provided for the purposes of illustrating a preferred embodiment of the present invention. Therefore, the person skilled in the art will understand that the present invention should not be considered to be limited solely to the features as shown in the attached drawings.

Turning now to FIGS. 1 to 6, the apparatus 10 is an apparatus designed for raising and inverting rubbish bins and/or containers to empty the contents of the rubbish bins and/or containers. The apparatus 10 comprises a frame 12. The frame 12 includes a base frame 14 made from a variety of base frame members joined together, such as by welding. The person skilled in the art will appreciate that there are a multitude of different base frame designs that could be used in accordance with the present invention. The base frame 14 carries a plurality of castors 16. Castors 16 enable the frame to be easily wheeled around a manufacturing site, building site or similar. One or more of castor 16 are suitably lockable castors so that the apparatus can be easily moved to a desired position and then the castors locked so that the apparatus remains in that position. Typically, two of the castors will be lockable castors.

The apparatus further comprises a support platform 18. Support platform 18 includes a restraining plate 20 that is carried by a generally vertical support 22. As can be seen from FIG. 1, the restraining plate 20 is positioned above the support platform 18 by a distance that is sufficient to enable a wheel 24 of a rubbish bin 26 to fit under the restraining plate 20. Although not able to be seen in FIG. 1, a similar restraining plate is positioned on the other side of the bin so that the other wheel of the bin 26 can fit thereunder. It will be appreciated that when the bin 26 is inverted, the wheels of the bin will contact the underside of the restraining plate 20 and this will act to hold the bin 26 in the apparatus.

A side frame member 28 is mounted on top of the restraining plate 20. Side frame member 28 bends about approximately 90° and includes a generally horizontal section 30. A further vertical frame member 32 is joined near an end of the generally horizontal section 30. Generally vertical frame member 32 is joined at its lower end to the support, platform 18 or to a support frame that holds the support platform 18. A similar frame type arrangement is provided on the other side of the rubbish bin and horizontal section 30, continues across from one side to the other side, thereby forming a cradle. The frame arrangements effectively provide a cradle into which the rubbish bin can be positioned.

The apparatus further includes an arm 34 that is joined at its lower end to the support platform 18 or to the frame that holds the support platform 18. Arm 34 may be joined to the support platform or to the support frame by welding. A bracing member 36 is joined at one end to the support platform 18 or to the frame that holds the support platform 18 and at its other end to arm 34. Bracing member 36 provides additional strength and support to arm 34.

Figure 7A:
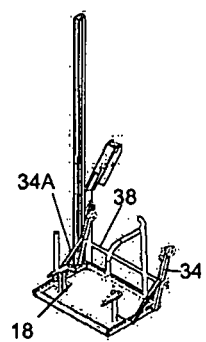

As can best be seen in FIG. 7A, a cross member 38 extends from arm 34 at a point intermediate to the ends of arm 34. The cross member 38 may extend from a generally midpoint of arm 34. Cross member 38 extends to a similar arm 34A that is joined to the apparatus in a similar manner to how arm 34 is joined to the apparatus.

Arm 34 carries a first roller 40. First roller 40 functions as the first tracking device. With reference to FIG. 7A, a similar first roller is mounted to arm 34A. As can be seen from FIG. 7A, the axis of first roller 40 is generally coincident with the longitudinal axis of cross member 38.

The apparatus 10 further includes a first track 42. First track 42 functions as the first guide. First track 42 is a generally straight track that extends in a generally vertical direction. The first track 42 may comprise a C-section member or it may comprise an open channel. The first roller 40 travels up and down along first track 42.

Arm 34 also carries a plurality of second rollers 44, 46. Rollers 44, 46 comprise the second tracking devices. Rollers 44 and 46 are mounted on opposite sides of arm 34, as can best be seen in FIG. 7. Roller 46 can contact either the outer side of first track 42 or can contact a second generally vertical fixed track 48. It will be appreciated that the weight of the support platform 18 will tend to try to cause the support platform 18 to rotate in a counter clockwise direction around roller 40 when the support platform is being raised. However, this brings the roller 46 into contact with either the outside of first track 42 or with the second generally vertical fixed track 48. This sets up a reaction force which maintains the support platform 18 in a generally horizontal orientation whilst the second roller 46 is travelling along the outside of the first track 42 or along the second generally vertical fixed track 48. First roller 40 also is pressed into contact with a side wall of track 42 and this also establishes a reaction force.

The apparatus further includes an angled fixed track 50 and a pivotally mounted guide sleeve 52. Pivotally mounted guide sleeve 52 is the second guide. The guide sleeve 52 is shown in its resting or unbiased position in FIG. 1. In this position it can be seen that the pivotally mounted guide sleeve 52 extends generally downwardly at an angle to the horizontal. Guide sleeve 52 is pivoted about a pivot point 54.

The apparatus 10 further includes a rear frame 56 made up of appropriate frame members 58, 60. The person skilled in the art will appreciate that the rear frame may have a number of different designs. The particular design of the rear frame is not particularly relevant to the present invention and it need not be discussed further.

The rear frame also includes a drive unit 62 that has an electric drive motor mounted therein. Electric drive motor may drive a chain drive (not shown), which chain drive may be used to move the first roller 40 upwardly and downwardly along the first track 42. The chain drive may drive a gear or cog (not shown) that is pivotally mounted to the axle 43 that itself is mounted to an upper cross member 45. The person skilled in the art will only appreciate how such chain drives operate.

The apparatus further includes a safety cage 64 that extends around the support platform 18 and the rubbish bin 26 that is positioned on the support platform 18. The safety cage 64 includes a safety door 66. Safety door 66 may be provided with a locking mechanism 67. Safety door 66 can be opened to provide access to the interior of the cage (and to load and unload bins into the cage). When a bin has been loaded into the cage, the safety door 66 is closed. The safety 1 cage 64 also includes an upper front wall 65 that cannot be opened. Therefore, the safety door 66 provides the only access to the apparatus.

The apparatus further includes a control unit (shown schematically in FIG. 1 at 68) for controlling operation of the drive unit 62. The control unit 68 may include an on switch and an off switch. The control unit 68 may also be arranged so that there is a safety interlock arrangement with the safety door 66 so that the drive unit 62 can only be operated if the safety door 66 is closed. The control unit 68 may require insertion of an appropriate key to allow operation of the control unit to occur.

In operation of the apparatus 10 shown in FIG. 1, the apparatus is moved so that it is positioned adjacent to a large rubbish receptacle, such as a dumpster or a skip. The locks on the castors 16 is then operated to lock the castors so that the apparatus 10 remains in its desired position. The safety door 66 is opened and a rubbish bin requiring emptying is wheeled into the safety cage 64 and on to the support platform 18. The rubbish bin 26 is positioned as shown in FIG. 1. The safety door 66 is then closed and control unit 68 is operated to engage the drive unit 62. The electric motor in the drive unit 62 causes rotation of a pulley or cog or gear and this causes the chain drive to move. The chain drive (not shown) is connected (either directly or indirectly) to the first roller 40 or to the support platform 18 or two or more of the frame members attached to the support platform 18.

When the drive unit is first engaged, it causes the support platform 18 to move upwardly. A short time after the drive unit is engaged, the support platform 18 has moved upwardly to the position shown in FIG. 2. In this position, the support platform 18 is positioned above the ground. The support platform 18 is maintained in a generally horizontal orientation by the roller 46 contacting the second generally vertical fixed track 48 and the first roller 40 contacting the first fixed track 42.

Figure 3:
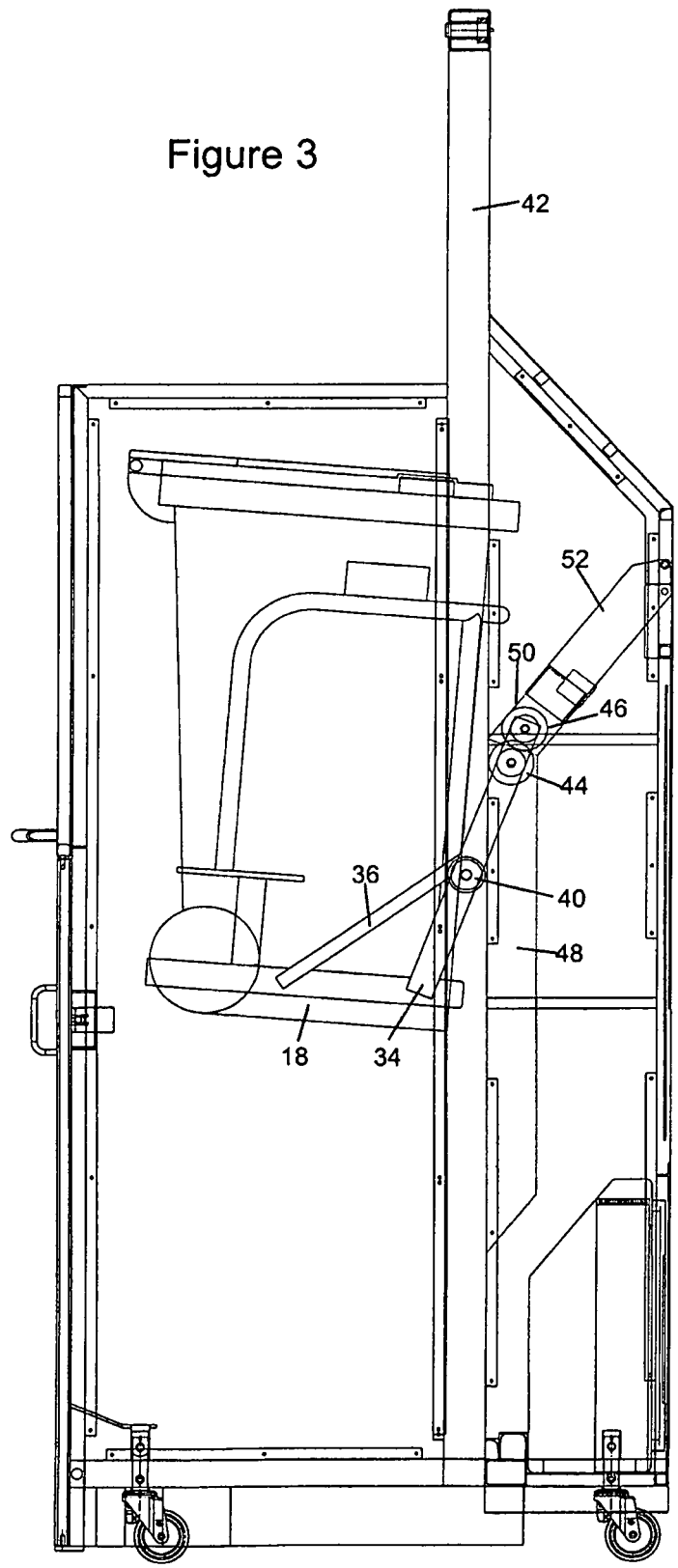
FIG. 3 shows a side view of the apparatus shown in FIG. 1.

As the drive unit continues to raise the support platform, the support platform reaches the orientation shown in FIG. 3. In FIG. 3, the roller 46 has come into contact with the angled fixed track 50. This causes the first roller 46 to travel along the upper wall of angled fixed track 50. This movement forces the first roller 46 to move away from the first track 42. As a result, the arm 34 starts to pivot around the first roller 40. This in turn causes the support platform 18 to rotate upwardly in a clockwise direction. This is shown in FIG. 3.

Figure 4:
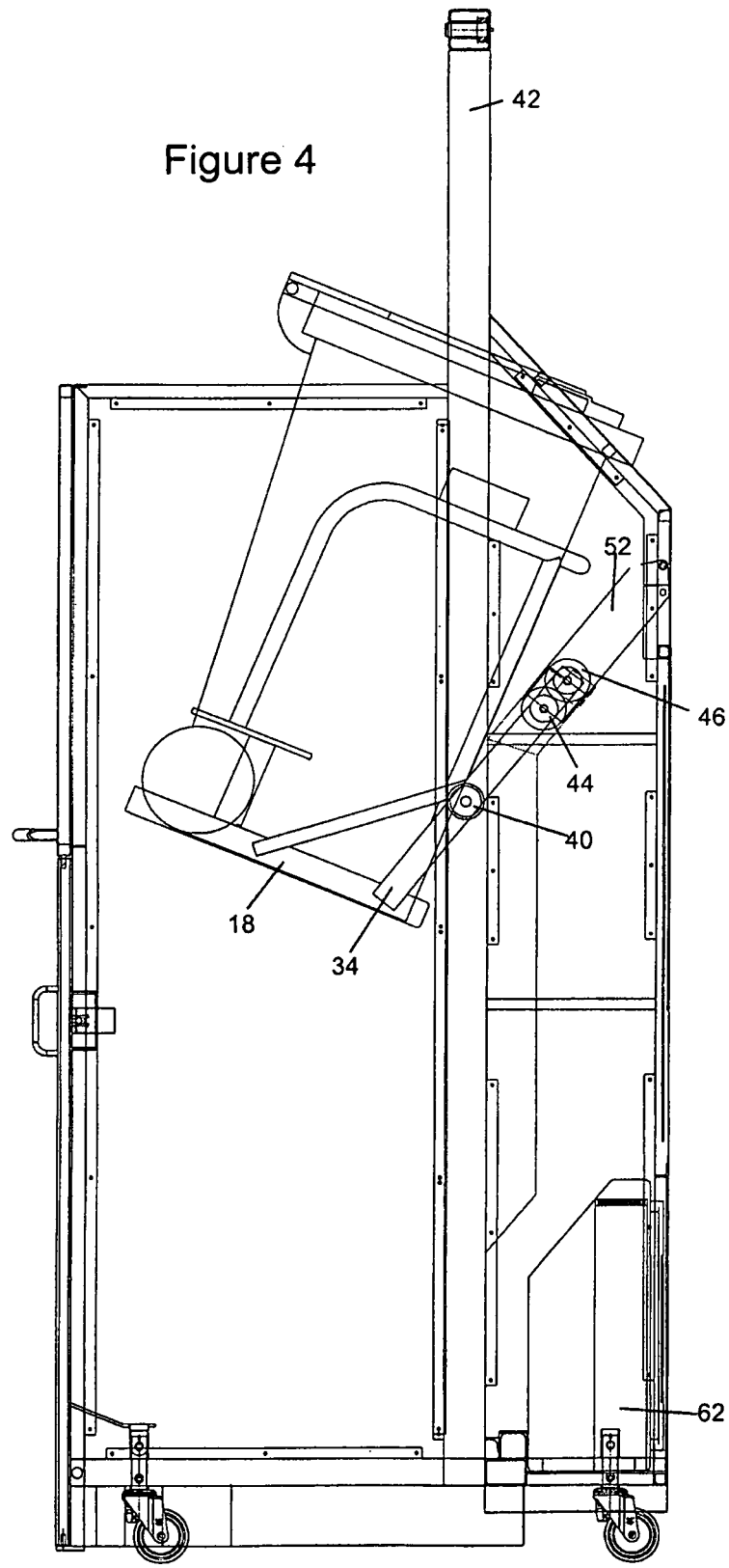
FIG. 4 shows a side view of the apparatus shown in FIG. 1.

As the drive unit continues to operate, the apparatus moves to the position shown in FIG. 4. In this position, the first roller 40 continues to move upwardly along track 42. At the same time, roller 46 enters into the pivotally mounted guide sleeve 52. The roller 44 also enters into the pivotally mounted guide sleeve 52, thereby locking the angle of arm 34 in relation to pivotally mounted guide sleeve 52. As there is a fixed spaced relationship between roller 40 and rollers 44, 46, the continued upward movement of the first roller 40 drives the rollers 44, 46 further along the guide sleeve 52, which causes rollers 44, 46 to move further away from the first track 42. This causes further rotation of arm 34 about the first roller 40 which, in turn, causes the support platform 18 to tilt further upwardly.

Figure 5:
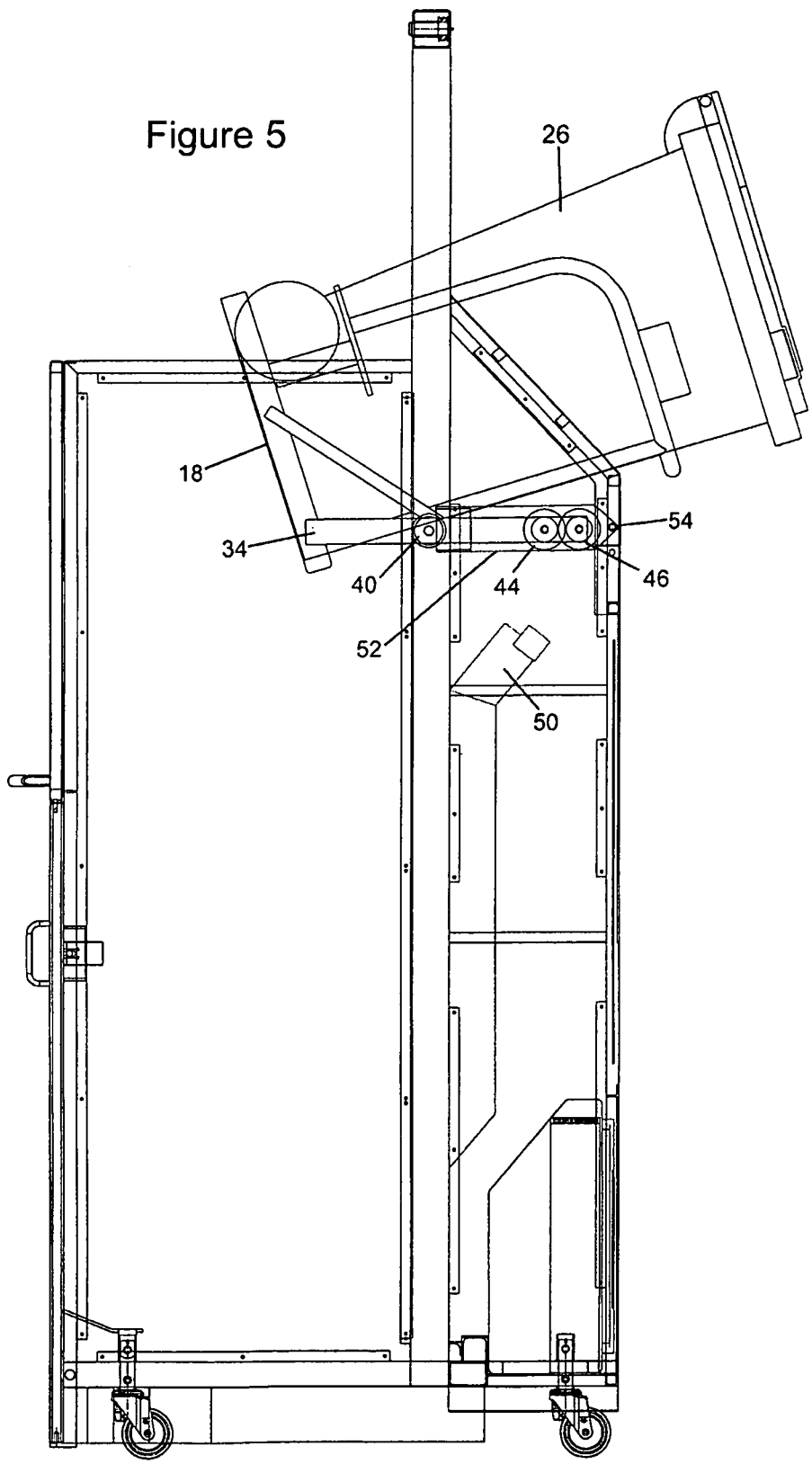
FIG. 5 shows a side view of the apparatus show in FIG. 1.

FIG. 5 shows the orientation the apparatus reaches as a result of the first roller 40 continuing to move upwardly. This forces the rollers 44, 46 to move even further along the pivotally mounted guide sleeve 52. Due to the upward forces imposed upon the pivotally mounted guide sleeve 52 (by virtue of the continued upward movement of roller 40 and the fixed spaced relationship between roller 40 and rollers 44, 46), the guide sleeve 52 rotates upwardly about its pivot point 54. As can be seen from FIG. 5, the guide sleeve 52 has reached an almost horizontal orientation. Again, this causes further rotation of the arm 34 about the first roller 40 and this continues to further tilt the support platform 18. As can be seen in FIG. 5, the rubbish bin 26 is approaching a horizontal orientation.

Figure 6:
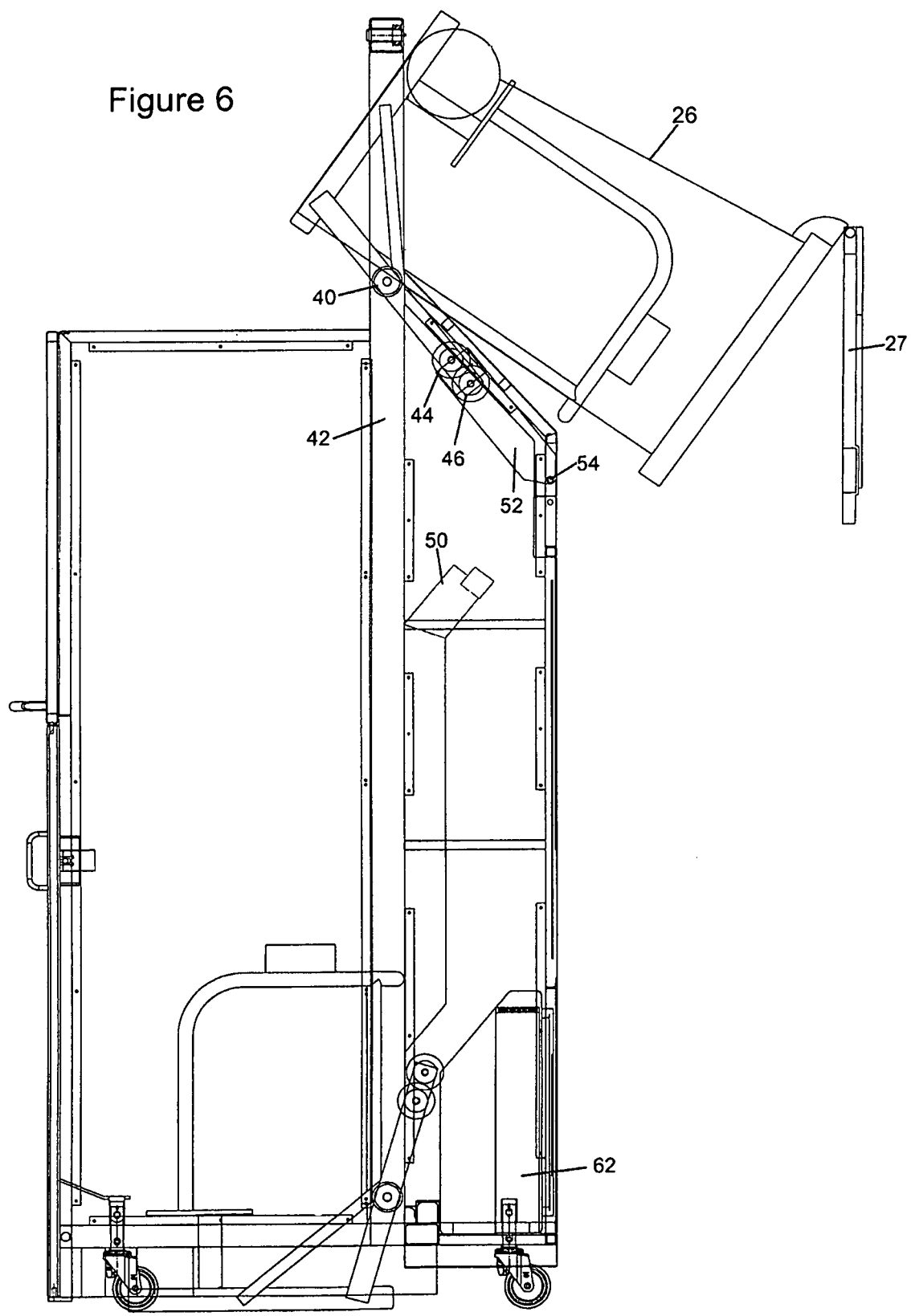
FIG. 6 shows a side view of the apparatus shown in FIG. 1.

As the drive unit operates further to cause the first roller 40 to move even higher up the first track 42, the apparatus adopts the orientation shown in FIG. 6. In FIG. 6, the drive unit 62 has moved the first roller 40 even further up the first track 42. As a result of this, the rollers 44, 46 have actually started to move outwardly along the pivotally mounted guide sleeve 52. As can be seen from FIG. 6, rollers 44, 46 are located away from the pivoted end of the guide sleeve 52. In comparison, in FIG. 5, the roller 46 is located almost at the pivot end of the guide sleeve 52. Due to the combined action of the first roller 40 continuing to move upwardly along first track 42 and the rollers 44, 46 moving outwardly along the pivotally mounted guide sleeve 52, as well as the fixed spaced relationship between roller 40 and rollers 44, 46, the rollers 44, 46 start to move closer to the first track 42. However, as first roller 40 is now located above the rollers 44, 46, this movement of rollers 44, 46 back towards the first track 42 causes further rotation of arm 34 which, in turn, causes a further tilting of the support. In the position shown in FIG. 6, the bin 26 is inverted, the bin lid 27 comes open and the contents of the bin can be tipped outwardly.

FIG. 6 also shows the pivotally mounted guide sleeve 52 being moved to a position in which it extends upwardly at an angle from its pivot point 54.

Once the rubbish bin 26 has been emptied, operation of the drive unit operates to drive the first roller 40 back downwardly along the first track 42. The rollers 44, 46 and the pivotally mounted guide sleeve 52 move back through the orientations shown in FIGS. 5, 4, 3 and 2 (with these movements taking place in turn and in sequence) until the support platform has returned to its lowermost position as shown in FIG. 1.

Figure 7:
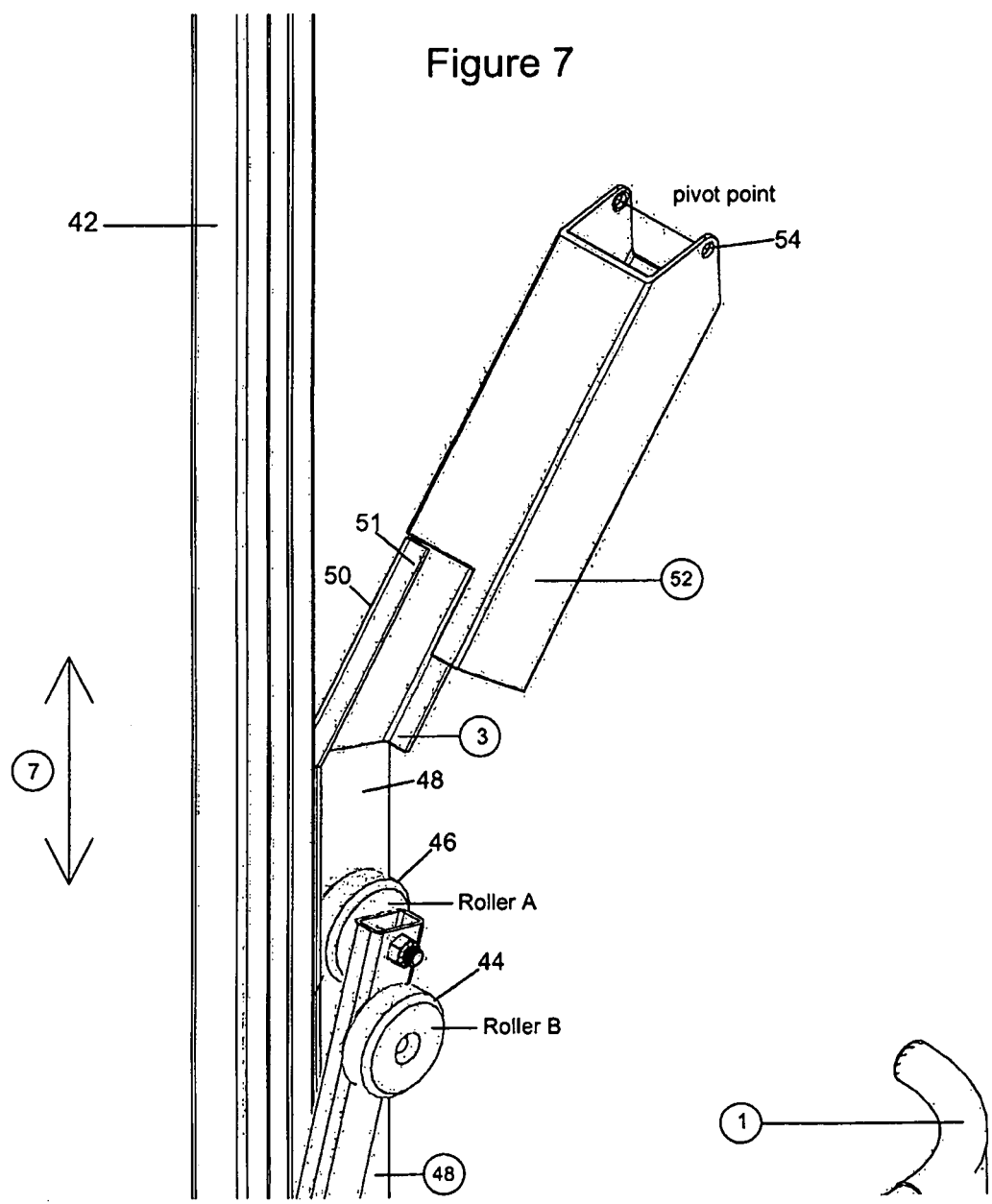
FIG. 7 shows an expanded view of the first guide and the second guide.

FIGS. 7 to 11 show an expanded view of the movement of the rollers 44, 46 into the angled fixed track 50 and then into the pivotally mounted guide sleeve 52. In FIG. 7, the rollers 44, 46 are located somewhere close to the position shown in FIG. 2. As can be seen, roller 46 is contacting the second generally vertical fixed track 48. The roller 44 is not contacting anything at that stage. The orientation of support platform 18 in this position is shown in FIG. 7A.

As shown in FIG. 7, the angled fixed track 50 includes angled wall 51 that guides the roller 46 along the angled fixed track 50. As can also be seen in FIG. 7, the guide sleeve 52 comprises a hollow, generally C-shaped or hollow square shaped section. The guide sleeve 52 suitably comprises a mild steel. The lower end of guide sleeve 52 may be shaped to promote easier passage of the rollers 44, 46 into the guide sleeve 52 and also to promote proper interaction between guide sleeve 52 and angled fixed track 50.

Figure 8A:
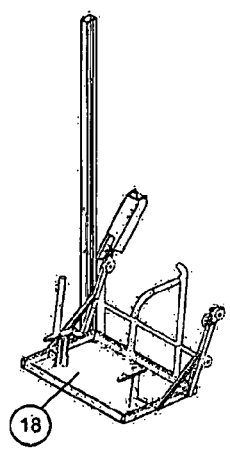
FIG. 8 shows an expanded view of the first guide and the second guide, with the second tracking device just entering the second guide.
Figure 8:
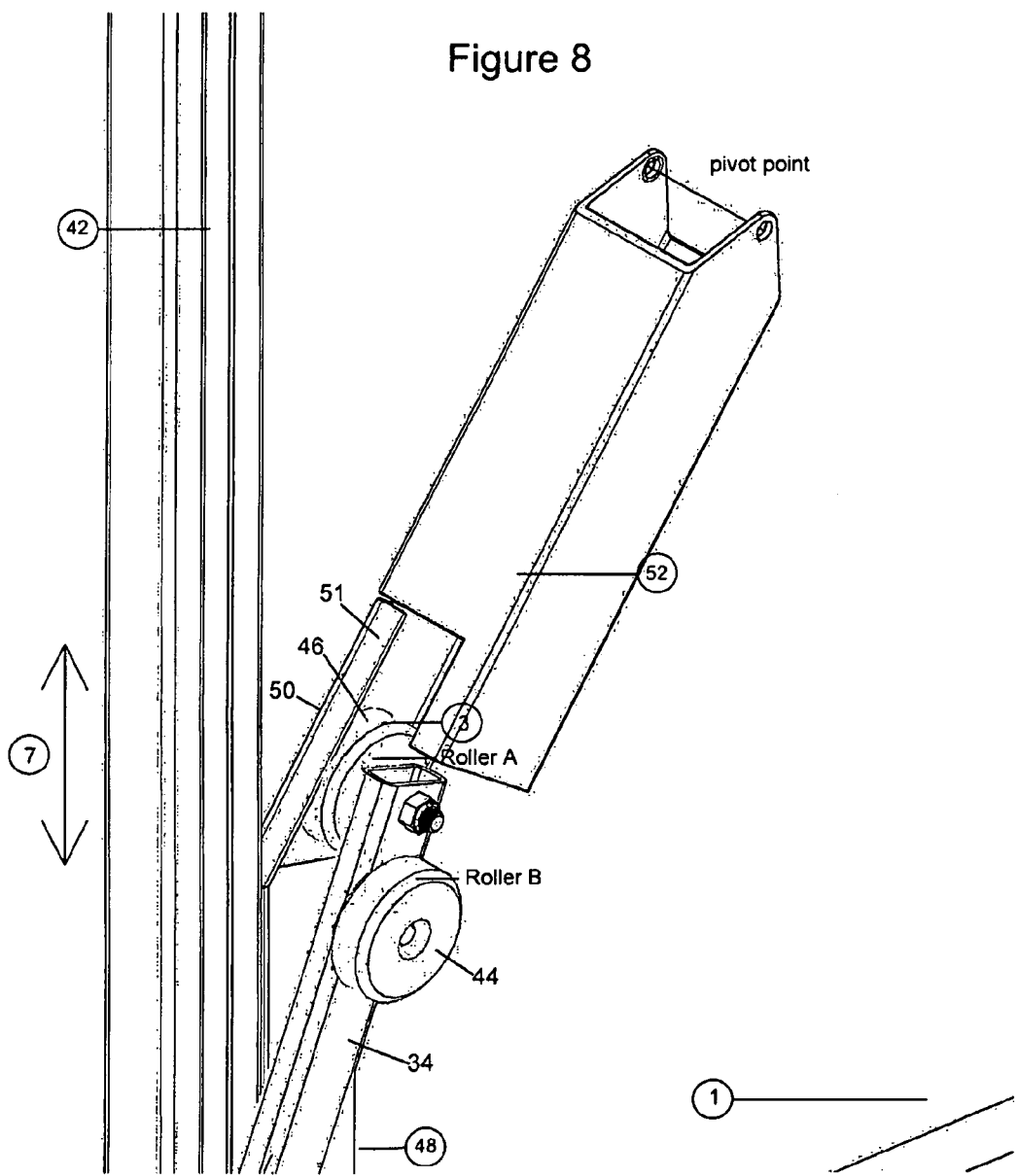

In FIG. 8, the roller 46 is approximately in the position are shown in FIG. 3. In FIG. 8, the roller 46 is contacting the wall 51 of angled fixed track 50. This is starting to move the roller 46 along the angled fixed track 50. As a result, a horizontal spacing is starting to be imparted between the roller 46 and the first track 42. This commences rotation of the arm 34 about the first roller 40. As can be seen from FIG. 8A, support platform 18 is just starting to tilt.

FIG. 9 shows the apparatus in the position shown in FIG. 4. In FIG. 4, roller 46 and roller 44 have both just entered the pivotally mounted guide sleeve 52. Effectively, roller 46 has travelled along almost all of the angled length of wall 51 of angled fixed track 50. This causes further rotation of arm 34 about the first roller 40.

As can be seen from FIG. 9A, this causes further tilting of support platform 18.

Figure 10A:
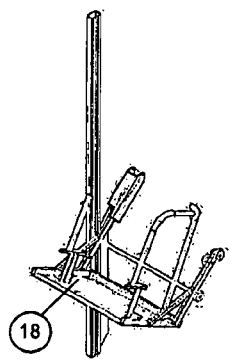
FIG. 10 shows an expanded view of the first guide in the second guide, with the second tracking device continuing to move along the second guide.
Figure 10:
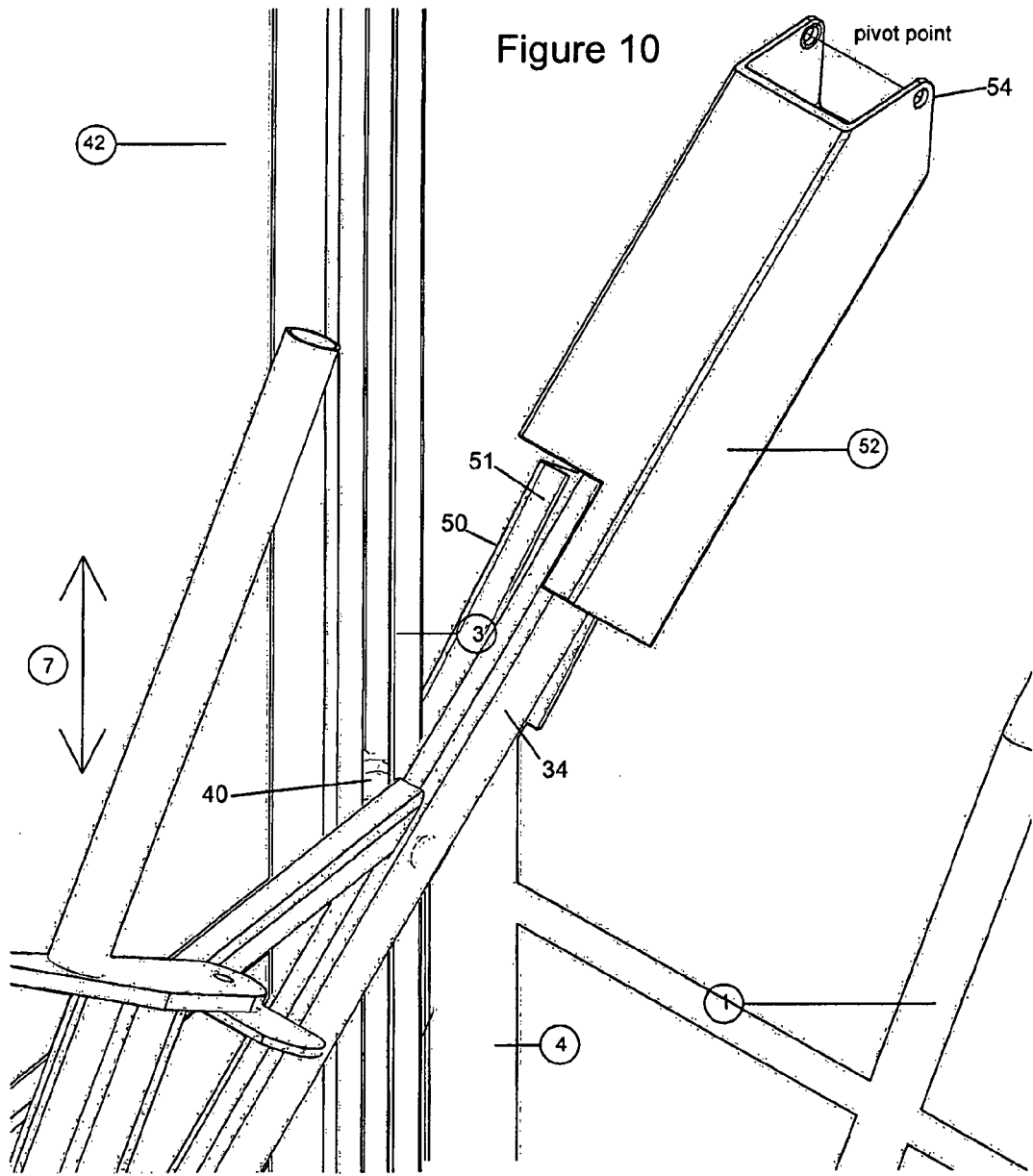

FIG. 10 shown as an expanded view of the arm 34 with the rollers 44, 46 having travelled 1 further into the guide sleeve 52. As can be seen in FIG. 10, pivotally mounted guide sleeve 52 has started to rotate upwardly. In this regard, the position shown in FIG. 10 is intermediate the position shown in FIGS. 4 and 5. First roller 40 can also be seen in FIG. 10. FIG. 10A shows that further tilting of support platform 18 has taken place. Rotation of the guide sleeve 52 in the upwards direction occurs because the rollers 44, 46 have entered into the guide sleeve 52. It will be understood that the rollers 44, 46 are mounted in a fixed spaced relation to roller 40, which is travelling along the first track. As the roller 40 move upwardly along the first track, the rollers 44, 46 also want to move in upwards direction (due to a fixed, spaced relationship between roller 40 and rollers 44, 46). However, the rollers 44, 46 are now positioned inside guide sleeve 52. Guide sleeve 52 is pivoted about pivot point 54. Accordingly, the guide sleeve 52 can only move in a pivotal manner about pivot point 54. Accordingly, in order to maintain the fixed spaced relationship between roller 40 and rollers 44, 46, the rollers 44, 46 continue to move along and into guide sleeve 52 as roller 40 moves upwardly. Further, the rollers 44, 46 also impose an upward lifting force on guide sleeve 52, thereby causing guide sleeve 52 to rotate upwardly about pivot point 54.

Figure 11A:
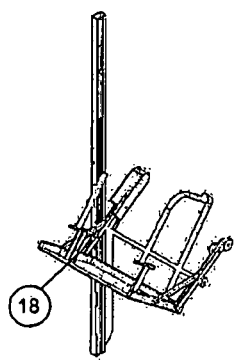
FIG. 11 shows an expanded view of the first guide and the second guide, with the second tracking device continuing to move along and into the second guide.
Figure 11:
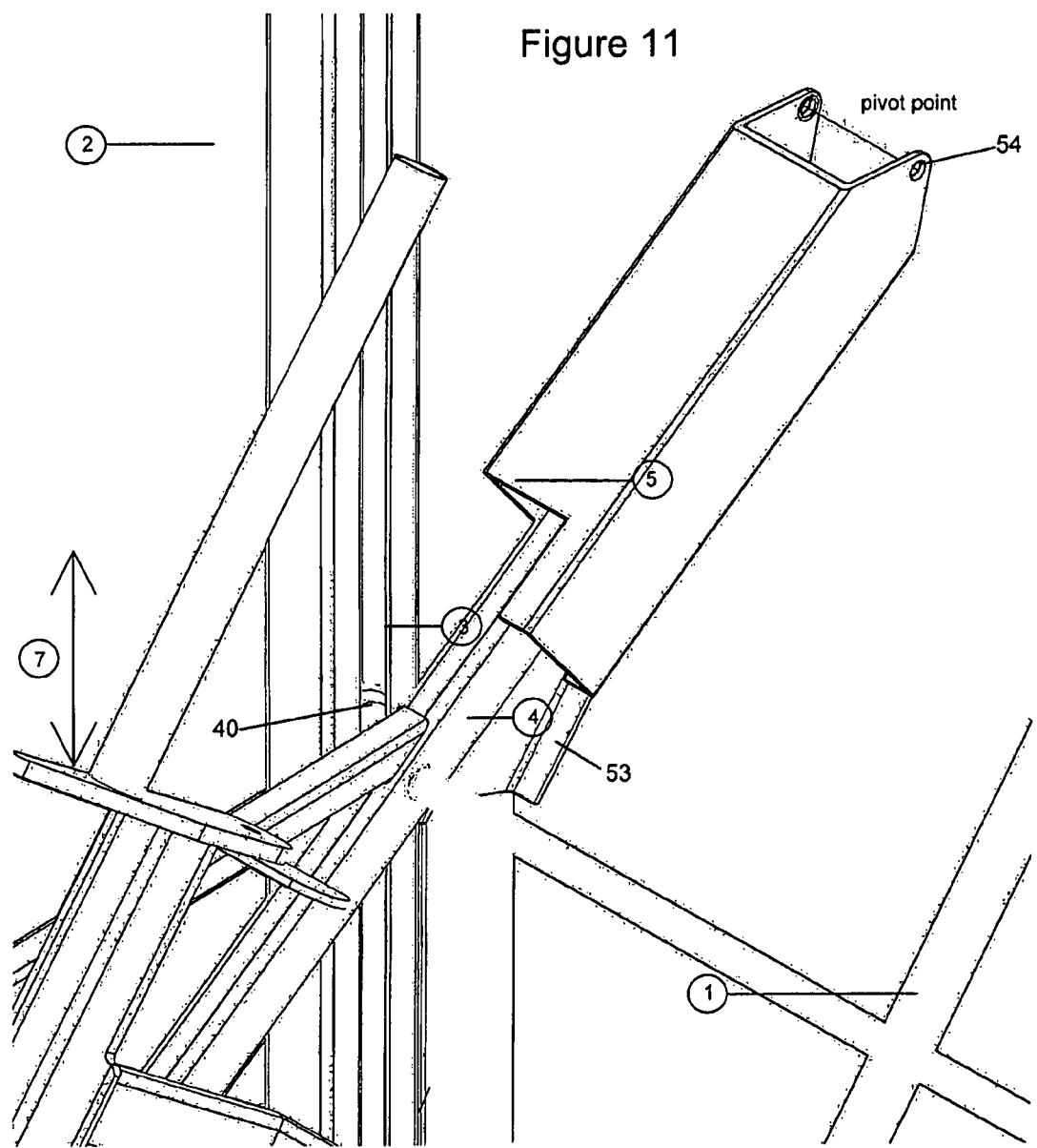

Continued upward movement of the first roller 40 moves the apparatus from the position 1 shown in FIG. 10 to the position shown in FIG. 11. This causes the pivotally mounted guide sleeve 52 to rotate further upwardly about pivot point 54. As can be seen from FIG. 11, the fixed angled track section 50 also includes a lower wall 53 that supports the end of the pivotally mounted guide sleeve 52 in the position as shown in FIG. 1 when the pivotally mounted guide sleeve 52 has no force applied to it.

Figure 12A:
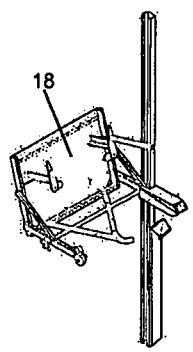
Figure 12:
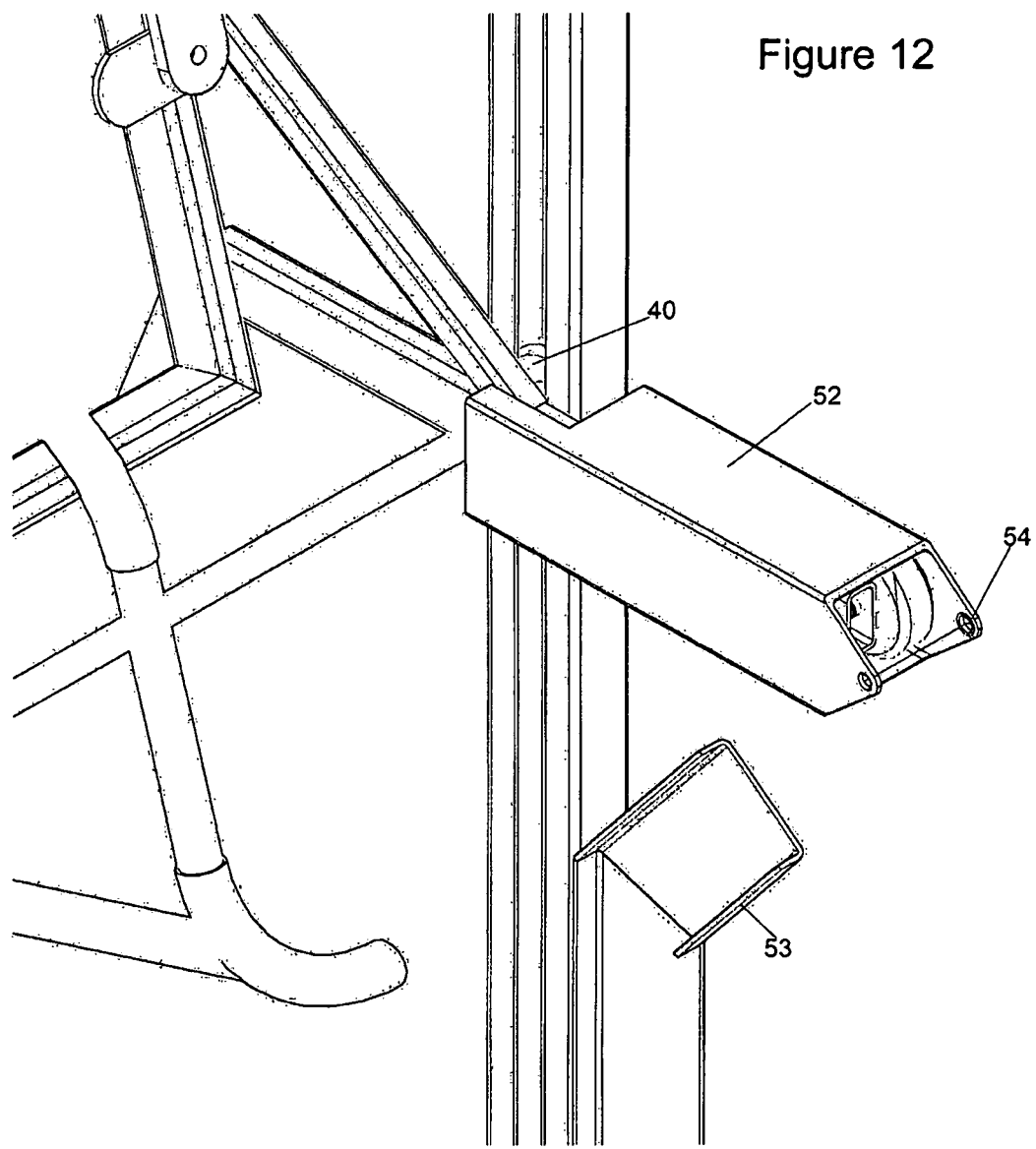
Figure 13:
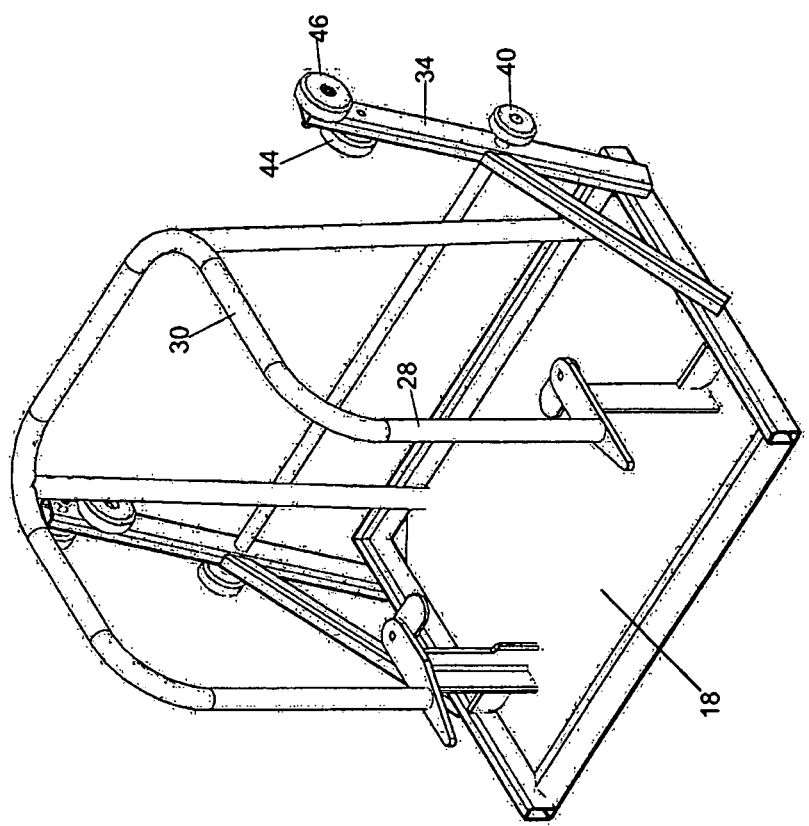
FIG. 13 shows a perspective view of the support and the cradle of the apparatus shown in FIG. 1.

Further upward movement of the first roller 40 thereafter moves the apparatus to the position shown in FIGS. 12 and 12A.

Although not shown in FIGS. 1 to 6, if it was desired to fully invert the bin 26, a further angled fixed track that extends upwardly at an angle generally similar to the angle of the pivotally mounted guide sleeve 52 as shown in FIG. 6 could be provided to receive the rollers 44, 46. The further end of fixed track would also ideally retain the pivotally mounted guide sleeve 52 in the orientation shown in FIG. 6 until the drive unit operates to move the rollers 44, 46 back into the guide sleeve 52.

Returning now to FIGS. 1 to 6, it can be seen that the bin 26 never travels beyond the front edge of the safety cage 66, even when it is being rotated (as best shown in FIGS. 4, 5 and 6). This is achieved by virtue of the mechanism incorporating the first fixed guide and the second pivoting guide. Further, the apparatus does not form any pinch points. Particular reference is made to FIG. 6 in this regard, where it can be seen that the bin 26 does not hit any crossbars when in the inverted position. Further, there is space between the side of the bin and the side of the apparatus to prevent a body part (such as an arm or hand) from being crushed when the bin has been inverted but not yet returned to ground level. This represents a significant safety improvement over previous inverting apparatus.

Those skilled in the art will understand that the present invention may be susceptible to variations and modifications other than those specifically described. It will be understood that the present invention encompasses all such variations and modifications that fall within its spirit and scope.

The invention claimed is:

1. An apparatus for at least partly inverting an object comprising a support platform for supporting the object,
a first guide,
a second guide, the second guide being pivotally mounted,
a first tracking device being positioned in fixed location relative to the support platform, the first tracking device being movable along or within the first guide,
a second tracking device being positioned in fixed location relative to the support platform, the second tracking device being adapted to move along or within the second guide, and
moving means for moving the support platform,
wherein the moving means is operable to cause the first tracking device to move in a first direction along or within the first guide and continued operation of the moving means in the first direction causes the second tracking device to enter the second guide, and further continued operation of the moving means in the first direction causes the first tracking device to continue moving in the first guide in the first direction and causes the second tracking device to move along the second guide and to cause pivotal movement of the second guide to thereby tilt the support platform.

2. The apparatus as claimed in claim 1, further comprising holding means for holding the object in position or restraining means for restraining the object on the support platform.

3. The apparatus as claimed in claim 1, wherein the first guide comprises a generally straight guide.

4. The apparatus as claimed in claim 1, wherein the first guide comprises a generally vertical guide.

5. The apparatus as claimed in claim 1, wherein the first guide comprises a track, a sleeve, a rack or a channel.

6. The apparatus as claimed in claim 1, wherein the second guide is pivotally mounted at or near one end thereof.

7. The apparatus as claimed in claim 1, wherein the second guide comprises a track or a sleeve or a channel.

8. The apparatus as claimed in claim 1, wherein the second guide is arranged such that it extends at an angle to both the horizontal and vertical when in a resting position.

9. The apparatus as claimed in claim 1, wherein the apparatus is provided with a fixed guide for guiding the second tracking device into the second guide.

10. The apparatus as claimed in claim 1, wherein the first tracking device comprises a roller or a body or a block of material that moves along or within the first guide.

11. The apparatus as claimed in claim 1, wherein the second tracking device comprises a roller or a body or a block of material that moves along or within the second guide.

12. The apparatus as claimed in claim 1, wherein the first tracking device is mounted to an arm and the second tracking device is also mounted to the arm, with the first tracking device being spaced from the second tracking device.

13. The apparatus as claimed in claim 1, wherein the apparatus is provided with one set of a first guide and a second guide located on one side of the support platform and a second set of a first guide and a second guide located on the other side of the support platform, with first and second tracking devices for each of the first and second guides also being provided.

14. The apparatus as claimed in claim 1, wherein the moving means comprises a drive means, a chain drive, a belt drive, a worm gear drive, a rack and pinion drive, a winch and cable drive, a gear drive, or an extendable and retractable ram.

15. The apparatus as claimed in claim 1, wherein the apparatus includes a safety door and/or a safety cage.

16. The apparatus as claimed in claim 1, further comprising control means for controlling operation of the moving means.

* * * * *